Patented July 9, 1935

2,007,802

UNITED STATES PATENT OFFICE 2,007,802

PAINT

Siegmund Jacobs, Comstock, Mich.

No Drawing. Application March 24, 1934, Serial No. 717,199

1 Claim. (Cl. 134—54)

The present improvement on my original invention or Patent No. 1,229,964, is with the idea practically found, that the liquid coating composition or paint, particularly for flat effects can be used to better advantage, when the liquid formula, and the liquid coating composition, will be produced in a manner and the use of such more effective ingredients in place of others as following described and specified.

I actually found, that if the liquid coating composition, will be produced, to be comparatively light in appearance, it can be used, as well in the production of paint for flat effects, where very often extreme light tints are desired, and as this concerns I found that, manganese borate, when used as a dryer, in the make of my composition by heat, has proven, being as well, of a powerful bleaching quality, and therefore, its use, as concerns the improvement, desirable.

I have also actually found, that solvent naphtha as to its quality, when used in place of gasolene, as a solvent for crude rubber, has proven its superior efficiency, in cutting and dissolving rubber, and therefore when used in place of gasolene for this purpose, time and labor can be saved, and as well the heating of the rubber solution as was indicated in my former and first specification or Patent No. 1,229,964, can be eliminated.

The invention consists primarily in the formula, for the liquid portion, of the paint and its combination, with the pigment formula of the composition, where rubber, for it being of a strong flatting nature, and certain other useful qualities, is the fundamental part, of the liquid formula or paint.

Thus for the liquid formula, of the composition or paint, forming the paint oil, which is to be incorporated with the paint pigments—I utilize:

|  | Ounces |
|---|---|
| Crude rubber | 3 |
| Solvent naphtha—2 quarts | 64 |
| Rock mineral oil, partly refined | 32 |
| Turpentine oil—6 quarts | 192 |

The crude rubber is dissolved by the solvent naphtha, and then the solution is diluted by the mixture therewith, of the petroleum, after which the turpentine is incorporated by gradually adding the diluted solution to the turpentine.

Thus, for the pigment formula I utilize:

|  | Ounces |
|---|---|
| Raw linseed oil—9 pints | 144 |
| China wood oil—3 pints | 48 |
| Kauri gum (resin) | 12 |
| Ester gum (resin) | 12 |
| Manganese borate | 4 |
| Sulphate of zinc | 2 |
| Red lead | 3 |

In preparing these ingredients, with the exception of the kauri gum, which will be added later on, all of the other ingredients, as above indicated, are to be put into a kettle, at the same time, and then heated gradually, to a degree of 475 F. and by this degree hold for one hour, when then in due time, the kauri gum is to be melted, separately, by a degree of 600 F. and diluted with the hot composition, and so in that way, then added, to the whole, of the composition, and then, the boiling continued, by the same degree, for one hour, and after this process, when the composition has cooled to about 250 degrees, the liquid rubber formula is to be gradually added, and the whole heated over again to a degree of 250 F. and by this degree held, for half hour, when then; after its completion, it should stand, for a certain time, to settle and clear.

The composition in that manner produced as heretofore described, forms a paint oil of a strong flatting nature and usefulness, particularly most practical in the production of paints for flat effects, that as to qualities, can be used for various purposes, on interior and exterior work, being elastic, weather-proof, of large spreading capacity and absolutely washable. They can be dried by air in a reasonable time, or baked on any metal, with the most adherent firmness and perfection, are lacquer-proof and rust resisting.

This is an achievement made possible, which concerns paint, in this category, that never before existed.

In the production of paints, for flat effects, where the paint pigments are first ground in 8 or 10% of linseed oil or varnish, the composition is to be used comparatively double the amount for diluting, and the rest for thinning, turpentine or volatile mineral spirits, can be used.

For the grinding of paint pigments, intended for flat effects, the composition is to be mixed with one third part of linseed oil or varnish, with two parts of the composition, and the rest for thinning, turpentine or volatile mineral spirits can be used.

I completed a good deal of work on interiors and exteriors, during a period of several years, whereby I have used my liquid coating composition and paints thereof for these projects to good advantage as far as concerns the composition in darker form, and have as well supplied many others in that line with my composition.

What I claim is:

A liquid composition comprising crude rubber, solvent naphtha, petroleum, turpentine, linseed oil, China wood oil, kauri gum, ester gum, manganese borate, sulphate of zinc and red lead in such proportions as to make the composition suitable for use as a paint.

SIEGMUND JACOBS.